UNITED STATES PATENT OFFICE.

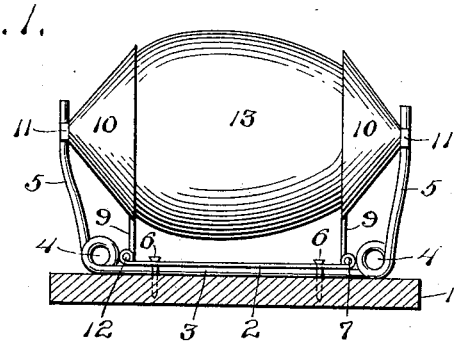
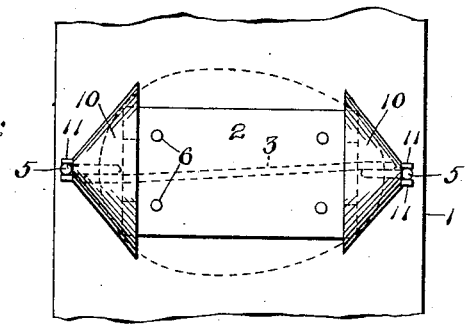
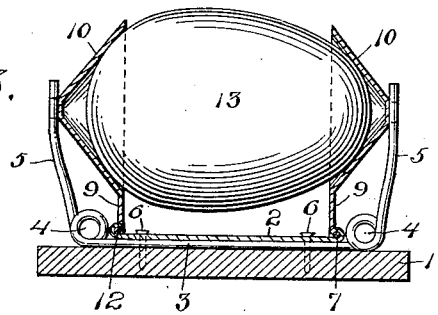
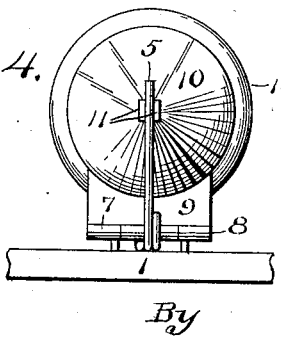

SZAVA MRKSITY, OF PEORIA, ILLINOIS.

EGG-HOLDER.

999,054.   Specification of Letters Patent.   Patented July 25, 1911.

Application filed November 3, 1910. Serial No. 590,434.

*To all whom it may concern:*

Be it known that I, SZAVA MRKSITY, a subject of the King of Hungary, residing at Peoria, in the county of Peoria and State of Illinois, have invented certain new and useful Improvements in Egg-Holders, of which the following is a specification, reference being had therein to the accompanying drawing.

This invention relates to egg holders, and the objects of the invention are to provide means in a manner as will be hereinafter set forth for firmly holding an egg during the transportation, preventing the egg from contacting with other eggs or becoming broken.

Another object of the invention is to provide a yieldable egg holder that can be easily and quickly placed in engagement with an egg.

A further object of the invention is to provide an egg holder that is simple in construction, durable, and highly efficient for the purposes for which it is intended.

I attain the above objects by a mechanical construction that will be hereinafter specifically described and then claimed, and reference will now be had to the drawing, wherein:

Figure 1 is a side elevation of the egg holder showing an egg in position. Fig. 2 is a plan of the same showing the egg in dotted lines. Fig. 3 is a longitudinal sectional view of the egg holder, and Fig. 4 is an end view of the same.

The reference numeral 1 denotes a board or suitable support and arranged upon the support and held by a rectangular plate 2 is a piece of wire 3, said piece of wire at the ends of the plate 2 being bent to form convolutions 4, the ends of the piece of wire extending upwardly to provide posts 5.

The plate 2 is retained in engagement with the support 1 by tacks, screws, or other fastening means 6 and the ends of the plate are provided with barrels 7 and adapted to longitudinally aline with said barrels are the barrels 8 of hinged holders, each holder comprising an upright 9 and a conical or funnel-shaped retainer 10 having the apex thereof provided with lugs 11 arranged in parallelism to engage the posts 5. The barrels 8 of the holders are connected to the barrels 7 of the plate 2 by pivot pins 12.

The retainers 10 are adapted to engage the ends of an egg 13, and the resiliency of the posts 5 is sufficient to normally retain the retainers in engagement with the egg, whereby it cannot be displaced during shipment.

The holder in its entirety is made of light and durable metal, and while in the drawings there is illustrated a preferred embodiment of the invention, it is to be understood that the structural elements are susceptible to such changes as fall within the scope of the appended claims.

What I claim, is:

1. An egg holding means comprising a rectangular plate, a relatively wide upright hinged to each end of said plate, a conical-shaped holder carried by the upper end of each of said uprights, said holders opposing each other and adapted to engage the ends of an egg for suspending it, each of said holders provided at its apex with a pair of outwardly-extending lugs, and inwardly-projecting resilient posts extending between the pairs of lugs for maintaining the holders in engagement with the ends of the egg.

2. An egg holding means comprising a resilient member including a longitudinally-extending body-portion terminating at each end in convolutions, upwardly-disposed and inwardly-extending adjustable posts projecting from the convolutions, a plate mounted upon said body-portion, a support for the body-portion and plate, means extending through the plate and engaging with the support whereby the plate is secured in position and the body-portion maintained stationary, said convolutions engaging the ends of said plate, a pair of relatively wide uprights pivoted to each end of said plate, cone-shaped holders carried by the upper ends of the uprights and engaging the ends of an egg for suspending it, said posts engaging the apices of said holders for maintaining them in position against the ends of the egg.

In testimony whereof I affix my signature in the presence of two witnesses.

SZAVA MRKSITY.

Witnesses:
STEVE T. WEBER,
JOHN SZENTES.